United States Patent [19]

Sakurai

[11] Patent Number: 5,303,091
[45] Date of Patent: Apr. 12, 1994

[54] DIGITAL AUDIO TAPE RECORDER FOR RECORDING CHARACTER DATA WITH DIGITAL DATA

[75] Inventor: Keiichi Sakurai, Fussa, Japan

[73] Assignee: Casio Computer Co., Ltd., Tokyo, Japan

[21] Appl. No.: 18,470

[22] Filed: Feb. 16, 1993

Related U.S. Application Data

[63] Continuation of Ser. No. 825,409, Jan. 22, 1992, abandoned, which is a continuation of Ser. No. 431,745, Nov. 3, 1989, abandoned.

[30] Foreign Application Priority Data

Nov. 10, 1988 [JP] Japan ................. 63-284144

[51] Int. Cl.$^5$ .................... G11B 5/02; G11B 5/09
[52] U.S. Cl. .................... 360/19.1; 360/32; 360/48
[58] Field of Search ............ 360/32, 48, 18, 19.1, 360/13, 72.2; 369/54, 58, 47

[56] References Cited

U.S. PATENT DOCUMENTS

| | | | |
|---|---|---|---|
| 4,821,128 | 4/1989 | Inazawa et al. | 360/72.2 |
| 4,833,549 | 5/1989 | Yoshimoto et al. | 360/18 |
| 4,837,641 | 6/1989 | Mori et al. | 360/32 |
| 4,893,199 | 1/1990 | Okada | 360/32 |
| 5,079,651 | 1/1992 | Tsuchida et al. | 360/72.2 |

FOREIGN PATENT DOCUMENTS 607671A 1/1985 Japan .

OTHER PUBLICATIONS

"WordPerfect Made Easy", Series 5 Ed., Mella Mineberg, pp. 534–539, 1989.
"WordPerfect Workbook for Personal Computers", 1990.

Primary Examiner—Donald Hajec
Assistant Examiner—Won Tae C. Kim
Attorney, Agent, or Firm—Frishauf, Holtz, Goodman & Woodward

[57] ABSTRACT

Digital data is recorded on a magnetic tape by rotary heads. The magnetic tape has a PCM data recording area on which PCM data of a plurality of programs is recorded and sub-code recording areas on which sub-code data is recorded. On the sub-code recording areas of each program, character code data representing the title of the associated program and the like is recorded. On the sub-code recording area of the first program, pack data of a TOC mode is recorded. The pack data of the TOC mode includes character code data, and this character code data includes information recorded on the sub-code recording areas corresponding to all programs. By reproducing the pack data of the TOC mode by the rotary heads, character code data of all programs can be recognized.

14 Claims, 14 Drawing Sheets

| ITEM | MODE |
|------|------|
| 0000 | NO INFORMATION |
| 0001 | PROGRAM TIME |
| 0010 | ABSOLUTE TIME |
| 0011 | RUNNING TIME |
| 0100 | TOC |
| ⋮ | ⋮ |
| 1000 | TEXT CHARACTER |
| 1010 | SEARCH CHARACTER |
| ⋮ | ⋮ |

FIG. 8

| MUSIC NO. | RECORDED CHARACTERS |
|-----------|---------------------|
| 1st MUSIC | ALLEGRO |
| 2nd MUSIC | MENUETTO_I_&_TRIO |
| 3rd MUSIC | ROMANCE |
| 4th MUSIC | MENUETTO_II_&_TRIO |
| 5th MUSIC | RONDO |

FIG. 14

| | MSB | | | | | | LSB |
|---|---|---|---|---|---|---|---|
| PC1 | 1 | 0 | 0 | 0 | SORT | | |
| PC2 | FMT | | | | ADR | | |
| PC3 | CHARACTER 1 | | | | | | |
| PC4 | CHARACTER 2 | | | | | | |
| PC5 | CHARACTER 3 | | | | | | |
| PC6 | CHARACTER 4 | | | | | | |
| PC7 | CHARACTER 5 | | | | | | |
| PC8 | PARITY | | | | | | |

FIG. 9

| | MSB | | | | | | | LSB |
|---|---|---|---|---|---|---|---|---|
| PC1 | 1 | 0 | 1 | 0 | SORT | | | |
| PC2 | FMT | | | | 0 | 0 | 0 | 0 |
| PC3 | CHARACTER 1 | | | | | | | |
| PC4 | CHARACTER 2 | | | | | | | |
| PC5 | CHARACTER 3 | | | | | | | |
| PC6 | CHARACTER 4 | | | | | | | |
| PC7 | CHARACTER 5 | | | | | | | |
| PC8 | PARITY | | | | | | | |

FIG. 10

| POINT | PNO | PC 4-7 |
|---|---|---|
| B0 | TOTAL TOC. NO. | ALL 0 |
| A0 | MUSIC NO. OF 1st MUSICAL PIECE | START TIME OF 1st MUSICAL PIECE |
| INDEX 00-99 | MUSIC NO. OF RESPECTIVE MUSICAL PIECE | START TIME OF RESPECTIVE MUSICAL PIECE |
| A1 | MUSIC NO. OF FINAL MUSICAL PIECE | END TIME OF FINAL MUSICAL PIECE |
| ⋮ | ⋮ | ⋮ |
| CA | MUSIC NO. OF RESPECTIVE MUSICAL PIECE | CHARACTER DATA |
| CB | MUSIC NO. OF RESPECTIVE MUSICAL PIECE | CHARACTER DATA |
| ⋮ | ⋮ | ⋮ |

|     | MSB |   |   |   |   |   | LSB |   |
|-----|-----|---|---|---|---|---|-----|---|
| PC1 | 0 | 1 | 0 | 0 | 0 | PNO-1 | | |
| PC2 | PNO-2 | | | | PNO-3 | | | |
| PC3 | 1 | 1 | 0 | 0 | 1 | 0 | 1 | 0 |
| PC4 | SORT | | | | FMT | | | |
| PC5 | CHARACTER 1 | | | | | | | |
| PC6 | CHARACTER 2 | | | | | | | |
| PC7 | CHARACTER 3 | | | | | | | |
| PC8 | PACK PARITY | | | | | | | |

(POINT=CA)

FIG. 13 (a)

|     | MSB |   |   |   |   |   | LSB |   |
|-----|-----|---|---|---|---|---|-----|---|
| PC1 | 0 | 1 | 0 | 0 | 0 | PNO-1 | | |
| PC2 | PNO-2 | | | | PNO-3 | | | |
| PC3 | 1 | 1 | 0 | 0 | 1 | 0 | 1 | 1 |
| PC4 | SORT | | | | ADR | | | |
| PC5 | CHARACTER 1 | | | | | | | |
| PC6 | CHARACTER 2 | | | | | | | |
| PC7 | CHARACTER 3 | | | | | | | |
| PC8 | PACK PARITY | | | | | | | |

(POINT=CB)

FIG. 13 (b)

| ST-ID | SEARCH CHARACTER PACK DATA | ADD. | TEXT CHARACTER PACK DATA | DISPLAY |
|---|---|---|---|---|
| 1  0 | | | | |
| | ALLEG | 0 | ALLEG | ALLEG |
| | ALLEG | 0 | ALLEG | ALLEG |
| | ALLEG | 1 | RO$^{C_R L_F N_L}$ | ALLEGRO |
| | ALLEG | 1 | RO$^{C_R L_F N_L}$ | ALLEGRO |
| | ALLEG | | | (CONTINUE DISPLAY |
| | ALLEG | | | TILL NEXT ST-ID) |
| | ALLEG | | | |
| | ALLEG | | | |
| | | | | (CLEAR) |
| | MENUE | 0 | MENUE | MENUE |
| | MENUE | 0 | MENUE | MENUE |
| | MENUE | 1 | TTO_I | MENUETTO_I |
| | MENUE | 1 | TTO_I | MENUETTO_I |
| | MENUE | 2 | _&_TR | MENUETTO_I_&_TR |
| | MENUE | 2 | _&_TR | MENUETTO_I_&_TR |
| | MENUE | 3 | IO$^{C_R L_F N_L}$ | MENUETTO_I_&_TRIO |
| | MENUE | 3 | IO$^{C_R L_F N_L}$ | MENUETTO_I_&_TRIO |
| | MENUE | | | (CONTINUE DISPLAY |
| | MENUE | | | TILL NEXT ST-ID) |
| | MENUE | | | |
| | MENUE | | | |

FIG.16

| NO. OF FRAMES | POINT | PNO | PC4 | | PC5 | PC6 | PC7 |
|---|---|---|---|---|---|---|---|
| n | B0 | 005 | 0 | 0 | 00 | 00 | 00 |
| n+1 | A0 | 001 | 0 | 0 | 00 | 00 | 00 |
| n+2 | 01 | 001 | 0 | 0 | 00 | 00 | 00 |
| n+3 | 01 | 002 | 0 | 0 | 08 | 21 | 02 |
| n+4 | 01 | 003 | 0 | 0 | 12 | 20 | 12 |
| n+5 | 01 | 004 | 0 | 0 | 08 | 12 | 04 |
| n+6 | 01 | 005 | 0 | 0 | 20 | 39 | 22 |
| n+7 | A1 | 005 | 0 | 0 | 26 | 13 | 19 |
| n+8 | CA | 001 | 0 | 0 | A | L | L |
| n+9 | CB | 001 | 0 | 1 | E | G | R |
| n+10 | CB | 001 | 0 | 2 | O | $C_R$ | $L_F$ |
| n+11 | CA | 002 | 0 | 0 | M | E | N |
| n+12 | CB | 002 | 0 | 1 | U | E | T |
| n+13 | CB | 002 | 0 | 2 | T | O | _ |
| n+14 | CB | 002 | 0 | 3 | I | _ | & |
| n+15 | CB | 002 | 0 | 4 | _ | T | R |
| n+16 | CB | 002 | 0 | 5 | I | O | $C_R$ |
| n+17 | CB | 002 | 0 | 6 | $L_F$ | $N_L$ | $N_L$ |
| n+18 | CA | 003 | 0 | 0 | R | O | M |
| n+19 | CB | 003 | 0 | 1 | A | N | C |
| n+20 | CB | 003 | 0 | 2 | E | $C_R$ | $L_F$ |
| n+21 | CA | 004 | 0 | 0 | M | E | N |
| n+22 | CB | 004 | 0 | 1 | U | E | T |
| n+23 | CB | 004 | 0 | 2 | T | O | _ |
| n+24 | CB | 004 | 0 | 3 | I | I | _ |
| n+25 | CB | 004 | 0 | 4 | & | _ | T |
| n+26 | CB | 004 | 0 | 5 | R | I | O |
| n+27 | CB | 004 | 0 | 6 | $C_R$ | $L_F$ | $N_L$ |
| n+28 | CA | 005 | 0 | 0 | R | O | N |
| n+29 | CB | 006 | 0 | 1 | D | O | $C_R$ |
| n+30 | CB | 006 | 0 | 2 | $L_F$ | $N_L$ | $N_L$ |
| n+31 | B0 | 005 | 0 | 0 | 00 | 00 | 00 |
| n+32 | A0 | 001 | 0 | 0 | 00 | 00 | 00 |

FIG. 17

DIGITAL AUDIO TAPE RECORDER FOR RECORDING CHARACTER DATA WITH DIGITAL DATA

This application is a continuation of application Ser. No. 07/825,409, filed Jan. 22, 1992, abandoned which is a continuation of Ser. No. 07/431,745 filed Nov. 3, 1989 (now abandoned).

BACKGROUND OF THE INVENTION

1. Field of the Invention

The present invention relates to a digital data record/play-back system for recording/playing back character data together with digital data.

2. Description of the Related Art

The recent developments of audio equipment are remarkable. A typical example is a compact disk player for playing back data on a disk on which an audio signal is digitized and recorded.

In the field of tape recorders, studies on a digital tape recorder (DAT) system (disclosed in, e.g., U.S. Pat. No. 4,523,237 to S. FUKUDA et al.) for recording/playing data on/from a magnetic tape have been made.

According to the DAT system, an analog audio signal is recorded in the form of a PCM signal on a DAT tape. The PCM signal is played back in the form of an analog audio signal. The DAT system can record and play back PCM signals with higher fidelity than a conventional analog recording system.

In order to best understand the present invention, general DAT standards will be described below.

A DAT (digital audio tape recorder) conference was established in 1981 to achieve DAT design standardization. DATs are classified into a stationary head type DAT (S-DAT) and rotary head type DAT (R-DAT). The R-DAT is considerately used as commercial equipment since it can employ known ½-inch VTR techniques. Both the S- and R-DATs have a 48-kH sampling frequency and 16-bit quantitization. A DAT tape has a width of 3.81 mm, and a tape cassette for R-DAT is $73 \times 54 \times 10.5$ mm$^3$. An R-DAT head drum has a diameter of 30 mm, a speed of 2,000 rpm, and a tape winding angle of 90 degrees. One track (one record of one head, a 23, 501-mm tape portion of 7.5-ms period) is divided into 196 blocks. PCM data including parity data constitutes 128 blocks. One block consists of 288 bits.

When a standard tape cassette is used, the R-DAT can perform 2-hour continuous record/playback operation. Therefore, when a plurality of musical pieces (one musical piece has a length of about 3 minutes) are recorded using this R-DAT, a very large number of musical pieces (i.e., 40) can be recorded. It is very difficult to search a musical piece to be played back from the tape recording such a large number of musical pieces. For this reason, in the DAT standards, a program number can be recorded for each musical piece (program), and a desired program number can be input to easily search the corresponding musical piece. However, in the method using the program number, a user must know a correspondence between musical pieces recorded on the tape and program numbers. For this purpose, program numbers and titles of musical pieces are written on a label of a tape cassette. Thus, a user finds a program number corresponding to a desired musical piece in accordance with the content of this label and can input the program number. However, if a user loses this label, he can hardly know a correspondence between program numbers and titles.

A technique to solve the above problem is disclosed in U.S. Pat No. 4,833,549 invented by I. Yoshimoto et al. In this technique, character code data is recorded into a sub-code recording area of each program, and in a playback mode, this character code data is played back and the character data corresponding to it is displayed.

To know the character data of all of the programs by the technique, considerably much time must be taken. The reason for this is that since the character code data is stored in the sub-code recording area of each program, the character code data is not played back and the character data is not displayed until the area of the DAT tape, in which the program is recorded, reaches the rotary heads.

For this reason, there is the need for the development of a new technique capable of quickly knowing the character data of all of the programs that are recorded on the DAT tape in the format in compliance with the R-DAT standards.

SUMMARY OF THE INVENTION

It is an object of the present invention to provide a digital data record/play-back system which can record character data in a format suitable for an R-DAT format and is capable of quickly knowing the character data relating to all of the programs.

In order to achieve the above object, there is provided an apparatus for recording character data together with digital data for a plurality of programs on a magnetic tape by using a rotary head, comprising:

a rotary drum means provided with said rotary head for performing recording on said magnetic tape, said magnetic tape being wound around said rotating drum means within a predetermined angular range, said rotary head recording oblique tracks, each of which has a PCM data recording area and sub-code recording areas;

signal processing means, for receiving the digital data, and including means for adding an error correction code to the digital data to generate PCM data complying with an R-DAT (rotary head type—digital Audio tape recorder) format;

sub-code processing means for generating sub-code block data having pack data corresponding to the R-DAT format, the pack data is composed of PC1-PC8, the PC1 includes 4 bits of pack item, a remainder of the PC1 and the PC2-PC7 compose 52 bits of data block, and the PC8 is parity block;

frame composing means coupled to said signal processing means and to said sub-code processing means, for composing the PCM audio data at a timing corresponding to said PCM audio recording area and the sub-code block data at a timing corresponding to said sub-code area to output the composed data as track format data corresponding to the R-DAT format;

recording means, coupled to said rotary head and to said frame composing means, for modulating the track format data and for outputting a recording signal to said rotary head;

storing means for storing character data related to each program; and control means, coupled to said sub-code processing means, to said recording means, and to said storing means, for supplying character code data corresponding to the character data stored said storing means to said sub-code processing means, for controlling said sub-code processing means so that said sub-code processing means generates the sub-code block data including the pack data of a TOC mode having the character code data of the TOC mode which include characters relating to all of the programs, and for controlling said recording means so that the generated sub-code block data is recorded in the sub-code recording area of the magnetic tape.

With such an arrangement, the pack data of the TOC mode is generated. The pack data contains character code data concerning all of the programs recorded on the magnetic tape. The pack data is recorded in a sub-code recording area on the magnetic tape. Accordingly, by reproducing the sub-code recording area and reading the TOC mode pack data, the character code data concerning each program can quickly be recognized.

BRIEF DESCRIPTION OF THE DRAWINGS

FIG. 8 is an item table showing contents of pack data in accordance with items of the pack data shown in FIG. 7;

FIG. 9 is a pack format when an item is set for a text character mode;

FIG. 10 is a pack format when an item is set for a search character mode;

FIGS. 13(a) and 13(b) show pack formats when the "POINT" is "CA" and "CB", respectively;

FIG. 14 is a table showing examples of entered characters vs. musical pieces;

FIG. 16 is a table showing relationships among the ST-ID (start ID), search character pack, text character pack, and displays;

FIG. 17 is a table tabulating relationships among the frame number, POINT, PNO, and PC4 to PC7 that are recorded in the magnetic tape;

DETAILED DESCRIPTION OF THE PREFERRED EMBODIMENT

An embodiment of a digital data record/play-back system according to the present invention will be described hereinafter with reference to the accompanying drawings. In this embodiment, a case will be exemplified wherein a rotary head type DAT is used, and the programs to be recorded in a magnetic tape are audio signals of a plurality of musical pieces.

Figure 1:
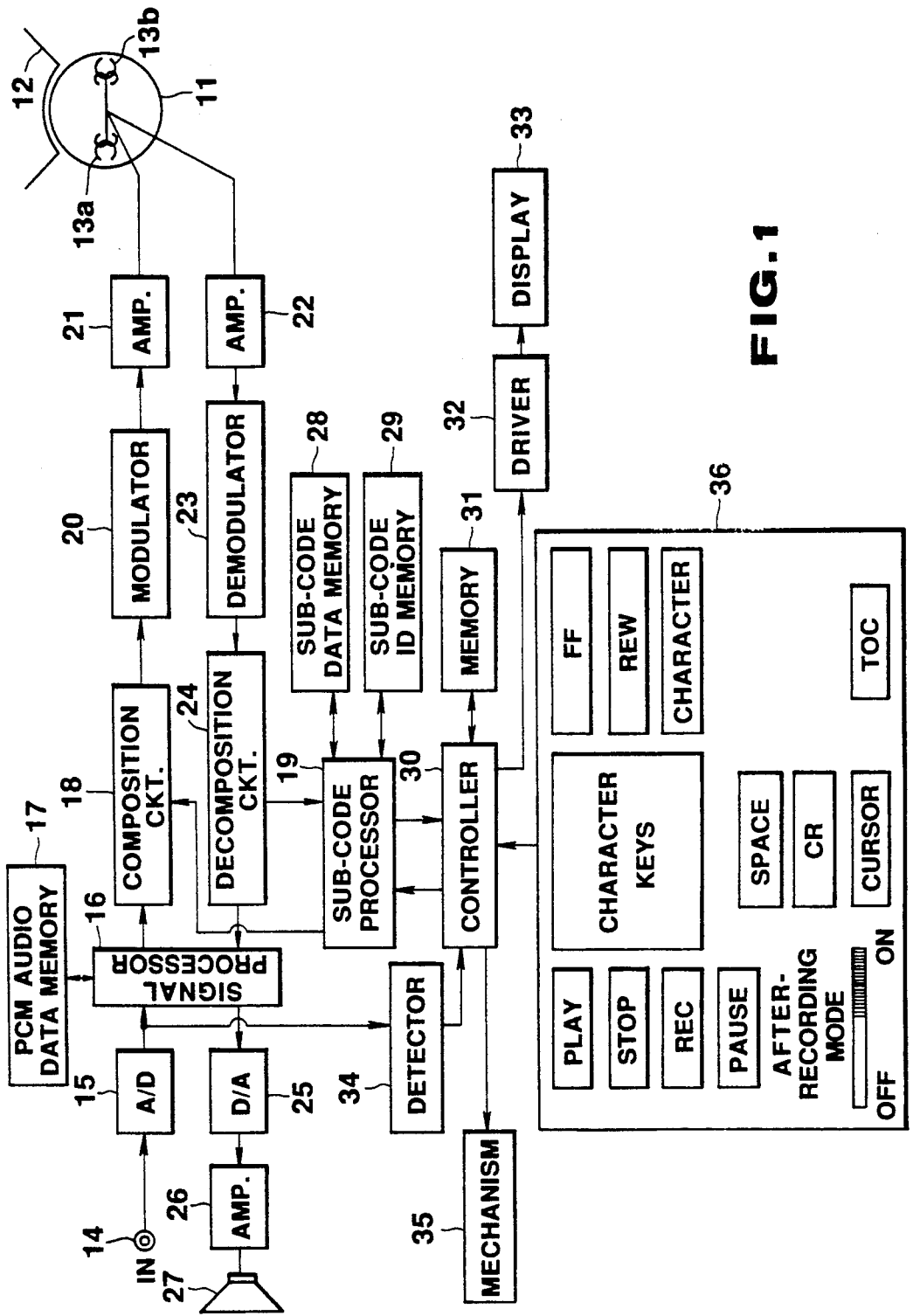
FIG. 1 is a block diagram showing an internal arrangement of an R-DAT according to an embodiment of the present invention.

FIG. 1 is a block diagram of the internal component of an R-DAT.

In FIG. 1, an input terminal 14 receives an analog audio signal to be recorded. An A/D converter samples the audio signal applied from the input terminal 14 at a sampling frequency of, e.g., 48 kHz, and converts the signal into a 16-bit digital audio signal. A signal processor 16 receives the digital audio signal and temporarily writes the digital audio signal in a PCM audio data memory 17, while performing interleave processing of the signal. Processor 16 adds an error correction code to the data written in the memory 17. Thereafter, the processor 16 reads out and time-base compresses the data from the memory 17, and outputs the readout data as PCM audio data corresponding to the R-DAT format. A frame composition circuit 18 synthesizes the PCM audio data output from the processor 16 and sub-code block data output from a sub-code processor 19 at timings of respective recording areas, and outputting the synthesized data as track format data corresponding to the R-DAT format. A modulator 20 performs modulation, suitable for magnetic recording, of the data output from the frame composition circuit 18. A recording amplifier 21 amplifies the modulated signal output from the modulator 20, and supplies the recording signal to rotary heads 13a and 13b for recording and playing back data on and from a magnetic tape 12. The two rotary heads 13a and 13b are provided to rotating drum. In a recording/playing back operation, the magnetic tape 12 is obliquely wound around the rotating drum 11 at an angular range of 90 degrees.

A play-back amplifier 22 amplifies a play-back signal read by the rotary heads 13a and 13b. A demodulator 23 demodulates the playback signal amplified by the amplifier 22 and outputs the demodulated data as track format data corresponding to the original R-DAT format. A frame decomposition circuit 24 decomposes the data output from the demodulator 23 into PCM audio data, present at the timing of a PCM recording area, and sub-code block data, present at the timing of a sub-code recording area. The PCM audio data output from the decomposition circuit 24 is sent to the signal processor 16, and is temporarily written in the memory 17. After the data is subjected to error correction processing, the data is also subjected to de-interleave processing and time-base expansion processing, and is then supplied to a D/A converter 25 as a digital audio signal. The D/A converter 25 converts the digital audio signal into an analog signal. The analog audio signal is amplified by an amplifier 26, and a corresponding sound is produced from a loud speaker 27.

In a recording mode, the sub-code processor 19 generates sub-code block data (corresponding to the R-DAT format) to be recorded in the sub-code recording area based on the storage contents of a sub-code data memory 28 and a sub-code ID memory 29, and outputs the data to the frame composition circuit 18. In a playback mode, the processor 19 causes the memories 28 and 29 to temporarily store the sub-code block data output from the decomposition circuit 24, and reads out necessary data from the memories 28 and 29 and outputs the data to a controller 30 under control of the controller 30. The controller 30 controls the entire system. The controller 30 performs data exchange with a control memory 31, and sends display data to a display 33 through a driver 32 to cause the display 33 to perform various display operations. The display 33 includes a TOC character display window and a text character display window, which will be described later. A blank period detector receives the digital audio signal in the recording mode, detects a blank period thereof, and supplies a blank period detection signal to the controller 30. A mechanism 35 is controlled by the controller 30, and includes various mechanical systems, such as a drum motor, a capstan motor, and the like. A key input unit 36 has various keys including at least keys of [PLAY], [STOP], [REC], [PAUSE], [SPACE], character, [CR], [CURSOR], [FF], [REW], [CHARACTER], [TOC], the after-record mode switch, and the like.

Figure 2:
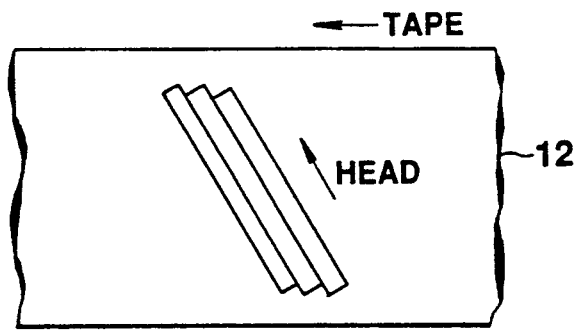
FIG. 2 is a view showing recording tracks on a magnetic tape used in this embodiment and known in the prior art.
Figure 3:
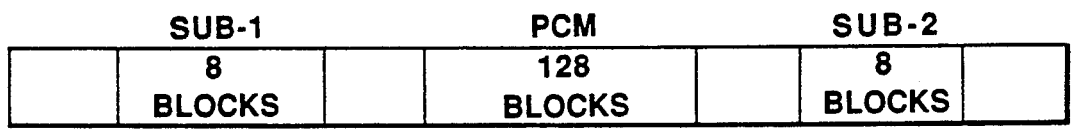
FIG. 3 is a view showing a prior art format of one track in FIG. 2.
Figure 4:
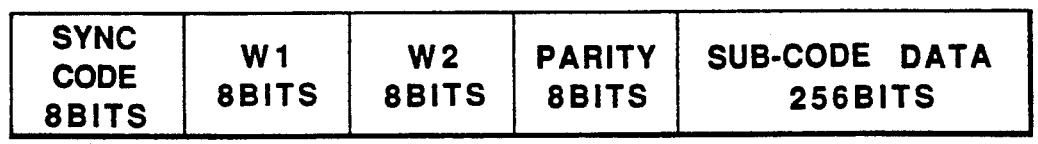
FIG. 4 is a view showing a prior art format of one sub-code block recorded in a sub-code recording area in FIG. 3.

FIG. 2 shows a track state recorded on the magnetic tape 12. As shown, recording tracks, inclined at a predetermined angle of about 6 degrees, are sequentially and alternately recorded on the magnetic tape 12 by the rotary heads 13a and 13b. As shown in FIG. 3, each recording track consists of a PCM audio record area located at the center and sub-code record areas SUB1 and SUB2 located on both sides of the PCM audio record area. The PCM audio record area has 128 blocks, and the subcode record areas have each 8 blocks. The PCM record audio area stores data obtained by pulse code modulating (PCM) an audio signal and attached to an error correction code thereto. The sub-code recording area stores sub-code block data having 8 block data. Each block data comprises a sync code of 8 bits, code W1 of 8 bits including sub-code ID and a block address, a parity for W1 and W2 (8 bits), and sub-code data (256 bits), as shown in FIG. 4.

Figure 5:
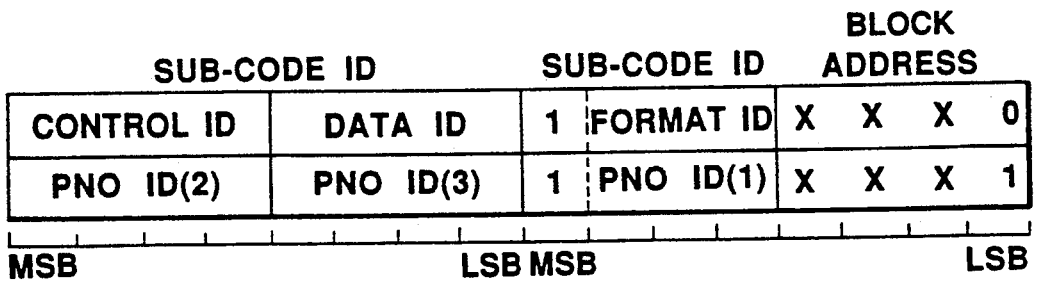
FIG. 5 is a view showing a prior art format of a sub-code ID in the sub-code ID.
Figure 6:
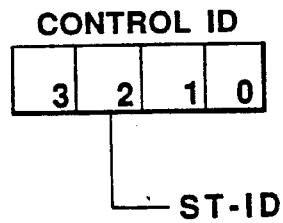
FIG. 6 is a view showing a prior art format of a control ID in the sub-code ID.

Two blocks of the sub-code ID (W1, 8 bits), two blocks of the block address, and two blocks of the sub-code ID (W2, 8 bits) constitute one unit formatted as shown in FIG. 5, More specifically, the upper 4 bits of the sub-code ID in an even-numbered block are used as a control ID, while the lower 4 bits are used as a data ID. The upper 4 bits of the sub-code ID in an odd-numbered block are used as a PNO.ID(2), while the lower 4 bits are used as a PNO.ID(3). In the portions of the block address and the sub-code ID, the most significant bits are determined as "1". The upper 3 bits in the even-numbered block are used for a format ID; the lower 4 bits, for the block address; the upper 3 bits in the odd-numbered block, for a PNO.ID(1); and the lower 4 bits in the even- and odd-numbered blocks, for the block address. The 3rd lowest bit in the 4-bit control ID serves to step a start ID, i.e., ST-ID serving as a control signal for searching the starting portion of a program. The ST-ID is recorded as "1" for about 300 frames (about 9 seconds) of the starting portion of each program. The PNO.ID(1) to PNO.ID(3) store absolute program numbers (001 to 799) of programs.

Figure 7:
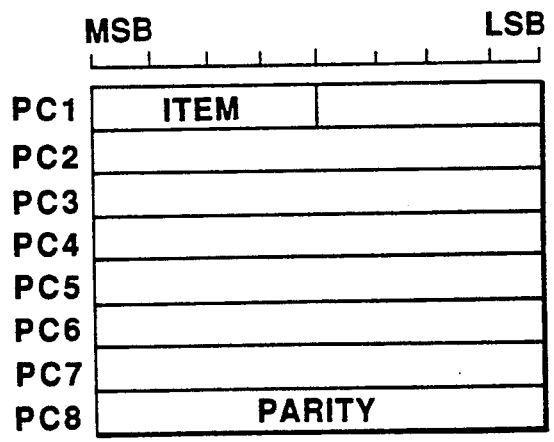
FIG. 7 is a view shown in a prior art format of pack data recorded in the sub-code recording area in FIG. 3.

The sub-code data (256 bits) in the sub-code block data includes four 64-bit pack data formated as shown in FIG. 7. As shown in FIG. 7, of 8-bit (1-byte) PC1 to PC8, the upper four bits of PC1 are assigned to an item for identifying a data content of the corresponding pack data, and PC8 is assigned to a parity for data in PC1 to PC7. Here, the pack data is made up of PC1 to PC8. As shown in an item table of FIG. 8, the pack data takes different modes that are respectively designated by items. If the item is "0000", the pack data indicates "no information". If "0001", a program time mode is set, and the pack data indicates a recording time of the corresponding program. If the item is "0010", a tape absolute time mode is set, and the pack data indicates a time from the beginning of a tape. If the item is "0100", TOC (table of contents) mode is set. The TOC mode will be described later. If the item is "1000", text character mode is set. The text character mode will be described later. "1010", search character mode is set. The search character mode will be described later.

The text character mode and the search character mode will be described. In the instant embodiment, the character code data of a maximum of 80 characters for one program (one musical piece) can be recorded in the sub-code recording area. The title of musical piece, name of artist, and words may be enumerated for the character code data to be recorded. The pack data in the text character mode is formated as shown in FIG. 9. More specifically, upper 4 bits (8th to 5th bits) of PC1 are assigned to the item "1000", and the lower 4 bits of PC1 are assigned to an identification code "SORT" indicating a content of character data. If code "SORT" is "0000", it corresponds to "General"; if "0001", "Words"; if "0000", "Artists"; and if "0011", "Title". Upper 4 bits (8th to 5th bits) of PC2 are assigned to an identification code "FMT" indicating types of code with which character data is recorded. If code "FMT" is "0000", it corresponds to an ASCII code (ASCII: American Standard Code for Information Interchange); if "0001", an ISO code (ISO: International Organization for Standardization); and if "0010", a JIS code (JIS: Japan Industrial Standards). Lower 4 bits of PC2 are assigned to a code "ADR" indicating an address of a pack format. PC3 to PC7 are assigned to character codes for five characters (each character corresponds to 1 byte). PC8 is assigned to a parity for PC1 to PC7.

The character code data of a maximum of 80 characters are divided, from the head of a train of the characters, into a maximum of 16 pack data each including 5 characters. The 16 pack data of the text character mode are formated as shown in FIG. 9. In this case, the address data "ADR" are represented by codes "0000" (decimal, 0) to "1111" (decimal, 15).

If the item is set to "1010", the search character mode is set. The pack data of the search character mode is formated as shown in FIG. 10. In this format, the four upper order bits of PC1 are coded "1010" of the time, and the four lower order bits of PC2 are coded "0000". The remaining fields of the format are the same as those of the format of the text character mode of FIG. 9. The pack data of the search character mode contains only the character code data of the first 5 characters of the maximum 80 characters of the character code data that corresponds to one program. The 5-character character code data is used as a search code in a playback mode. It is for this reason that the 4 lower order bits of PC2, which cooperate to represent an address of the pack format, are fixed to "0000".

The TOC (table of contents) mode of the pack data will be described.

Figures 11, 12:
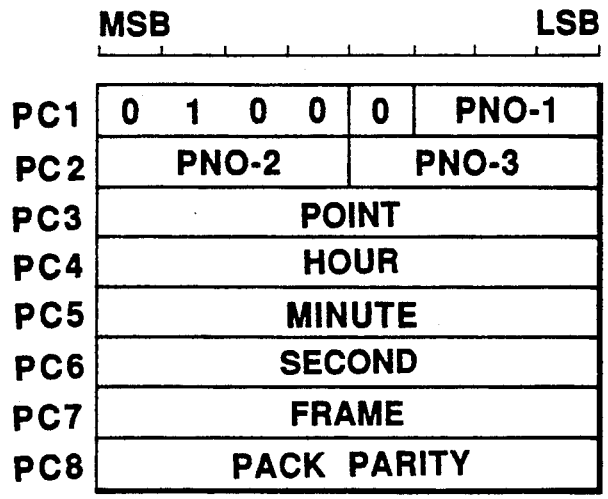
FIG. 11 is a pack format when an item is set for a TOC mode.
FIG. 12 is a TOC data table tabulating relationships of "POINTS" of the pack data of a TOC mode vs. pack data.

The pack data of the TOC mode indicates a table of contents of programs, which are recorded in a magnetic tape, and is stored in the sub-code data block. When the item is set to "0100", the pack data takes the "TOC" mode formated as shown in FIG. 11. In this format, "0100" of the item is set in the 4 upper order of PC1; "0", in the 4th bit as counted from the LSB; a program number "PNO-1", in the 3 lower order bits. Program numbers "PNO-2" and "PNO-3" are respectively set in the 4 upper order bits and the 4 lower order bits in PC2. The program numbers PNO-1 to PNO-3 store absolute program numbers 001 to 799 (decimal numbers). In the format, PC3 serves as "POINT" to indicate the contents of the pack data of the TOC mode. PC4 to PC6 contain data "Hour", "Minute" and "Second", respectively. PC7 contains data indicative of the number of frames. PC8 contains parity data for error check of the data of PC1 to PC7. The data "POINT" in PC3 discriminately indicates the pack data of the TOC mode, as shown in FIG. 12. When the "POINT" is "B0" (1011 0000), PNO-1 to PNO-3 indicates the total TOC number and, all 0's in the time data of PC4 to PC7. When the "POINT" is "A0" (1010 0000), PNO-1 to PNO-3 indicates the program (music) number (usually, 1, but it can be set at a desired number by an operator) of the first program (musical piece). And the PC4 to PC7 indicate the start time of the first program. When "POINT" is "00" to "99" (0000 0000 to 1001 1001), the PNO-1 to PNO-3 indicate the music number of each musical piece, and the time data of PC4 to PC7 indicate the start time of each musical piece. When "POINT" is "A1" (1010 0001), the PNO-1 to PNO-3 indicates the music number of the final musical piece, and the time data of PC4 to PC7 indicate the end time of the final musical piece. In this instance, the definition of the "POINT" is extended, when the "POINT" is "CA" (1100 1010) and "CB" (1100 1011), the data contained in the pack data of the TOC mode is assigned to the character code data.

The pack data of the TOC mode containing the character code data will be described. In this instance, in the text character mode that is designated by the item "1000", a maximum of 80 characters for one program can be recorded in the sub-code recording area. Similarly, in the TOC mode, character code data relating to each program (all programs) is recorded on sub-code recording area of a first program. In this case, the pack data of the TOC mode as is designated by the "POINT" of "CA" contains the character code data of the first 3 characters of the maximum 80 characters for one program. The remaining characters are divided into character groups each consisting of three characters. Those characters groups are contained in the pack data of the TOC mode as is designated by the "POINT" of "CB".

Pack data of the TOC mode, which contains that character code data, are shown in FIGS. 13(a) and 13(b). The pack data of FIG. 13(a) is used when the "POINT" is set to be "CA". As shown, the contents of the PC1 and PC2 in this pack data are the same as those of the PC1 and PC2 in the pack data of another TOC mode. In PC3, "POINT" is "CA", i.e., (1100 1010). In PC4, the 4 upper order bits represent "SORT", and the 4 lower order bits represent "FMT". PC5 to PC7 contain the 3-character character code data. PC8 contain parity data for error check of the data of PC1 to PC7. The "SORT" and "FMT" indicate the "contents of characters" and the "code format", respectively, like "SORT" and "FMT" of the pack data for the item "1000". The pack data of FIG. 13(b) is used when the "POINT" is set to be "CB". As shown, the contents of the PC1, PC2 and PC8 in this pack data are the same as those of the PC1, PC2 and PC8 in the pack data of another TOC mode. In PC3, "POINT" is "CB", i.e., (1100 1011). In PC4, the 4 upper order bits represent "SORT", and the 4 lower order bits represent "ADR". PC5 to PC7 contain the 3-character character code data. The "SORT" and "ADR" indicate the "contents of characters" and the "address", respectively. In this case, a maximum of 80 characters for one program can be stored. The first 3 characters of those characters are contained in the pack data for the "POINT" of "CA". The remaining characters are divided into character groups each consisting of three characters, and those character groups are contained in the pack data in which the "POINT" is "CB". Therefore, "0001" to "1111" are assigned to the "ADR" in the order of the characters. The sets of pack data of the TOC mode are set up for all of the programs recorded in the magnetic tape.

The pack data of the TOC mode are recorded in the sub-code recording area of the first program on the magnetic tape. The pack data of the text character mode and the search character mode are recorded in the sub-code recording area of the head portion of each program. The pack data of the other modes is recorded in the sub-code recording area of each program.

4 pack data whose contents are defined by the item described above is assigned to the sub-code data in one block. 64 pack data can be recorded per track and 128 pack data can be recorded per frame (two tracks). Of the 128 pack data, 16 pack data correspond to an error correction code.

OPERATION OF EMBODIMENT

The operation of the digital data record/play-back system thus arranged will be described.

In a normal record mode, the after-record mode switch is turned off, and the "REC" key is operated. Then, an audio signal applied from the input terminal 14 is pulse-code modulated and is recorded on the PCM audio recording area on the magnetic tape 12 by the A/D converter 15, processor 16, circuit 18, modulator 20, amplifier 21, and heads 13a and 13b. In this case, the blank period detector 34 detects a blank period in the digital audio signal from the A/D converter 15. When the detector 34 detects the blank period lower than a full scale level by $-42$ dB for four seconds or more, it outputs a high level blank period detection signal to the controller 30. The controller 30 determines that the trailing edge of this detection signal corresponds to the starting portion of a program, and sends a control signal to the sub-code processor 19. Under control of the controller 30, the processor 19 causes the sub-code ID memory 29 to store "1" as the ST-ID (start-ID) for searching the starting portion of a program, and to store the program number PNO, while increasing it by "1" in response to the trailing edge of the blank period detection signal. The processor 19 generates pack data containing the time data for the items "0001" and "0010", and causes the sub-code data memory 28 to store the pack data. The processor 19 reads out data from the memories 28 and 29, and generates the sub-code block data corresponding to the R-DAT, and supplies it to the frame composition circuit 18. Thus, the PCM audio data is recorded on the PCM audio recording area and sub-code block data is recorded in the sub-code recording area in the track format shown in FIG. 3.

When the "PLAY" key is operated, and the after-recording mode switch is turned off, the recorded on the tape 12 are played back by the rotary heads 13a and 13b. The digital audio signal is converted to an original analog audio signal, and a corresponding sound is produced from the loud speaker 27. The sub-code block data recorded in the sub-code recording area is decomposed by the frame decomposition circuit 24. The decomposed sub-code block data is sent to the sub-code processor 19. The processor causes the sub-code data memory 28 to sequentially store the pack data in the sub-code block data. The processor 19 causes another sub-code ID memory 29 to sequentially store the sub-code ID in the sub-code block data. The processor 19 reads out the pack data of the necessary item, and supplies the readout data to the controller 30. The controller 30 receives the program time data, for example, which is recorded as pack data of item "0001", and supplies it to the display 33 through the driver 32. Thus, display 33 displays a program time.

CHARACTER CODE RECORDING OPERATION

A case will be described wherein a character code is recorded as a sub-code. The character code is recorded in the after-record mode switch which is set by turning on the after recording mode. In this sense the operation "to rewrite the sub-code data" is called "after-record". In this embodiment, a character code consisting of a maximum of 80 characters is recorded.

Assume that five musical pieces are recorded in the PCM audio recording area on the tape 12 in the recording format as described above. Pack data of the item "0010" (including tape absolute time data) is recorded in each sub-code recording area over a range from the leading to the trailing end of the tape. Pack data of the item "0001" (including program absolute time data) is recorded in each sub-code recording area over a range from the leading to the trailing end of each program. The ST-ID a the program number (PNO) are recorded for 300 frames of the starting portion of each program.

In a normal playback mode, the data in the sub-code recording area is under control of the controller 30. As shown in FIG. 14, characters corresponding to the 1st to 5th musical pieces are entered to the tape 12 with those musical pieces recorded therein. To enter the characters, an operator turns on the after-record mode switch, and then operates the "CHARACTER" key. A maximum of 78 characters including spaces can be entered by means of alphanumeric keys for entering alphabetic letters, numerals, and symbols, and a "SPACE" key for entering spaces. To correct a mistaken character, for example, an operator moves a cursor to the character by a "CURSOR" key and enters a correct character at the cursor position. The characters to be entered are, for example, titles of musical pieces, names of artists, the first 78 characters of song. After the characters of one musical piece have been entered, a "CR" key is operated and enters the characters of another musical pieces. This process is repeated for all of the five musical pieces shown in FIG. 14.

The controller 30 receives operation signals in response to the entering of the characters, and sequentially stores key codes corresponding to the operated keys in a predetermined area of the memory 31. When the "PLAY" key is operated, the controller 30 executes a control flow shown in FIG. 15.

Figure 15:
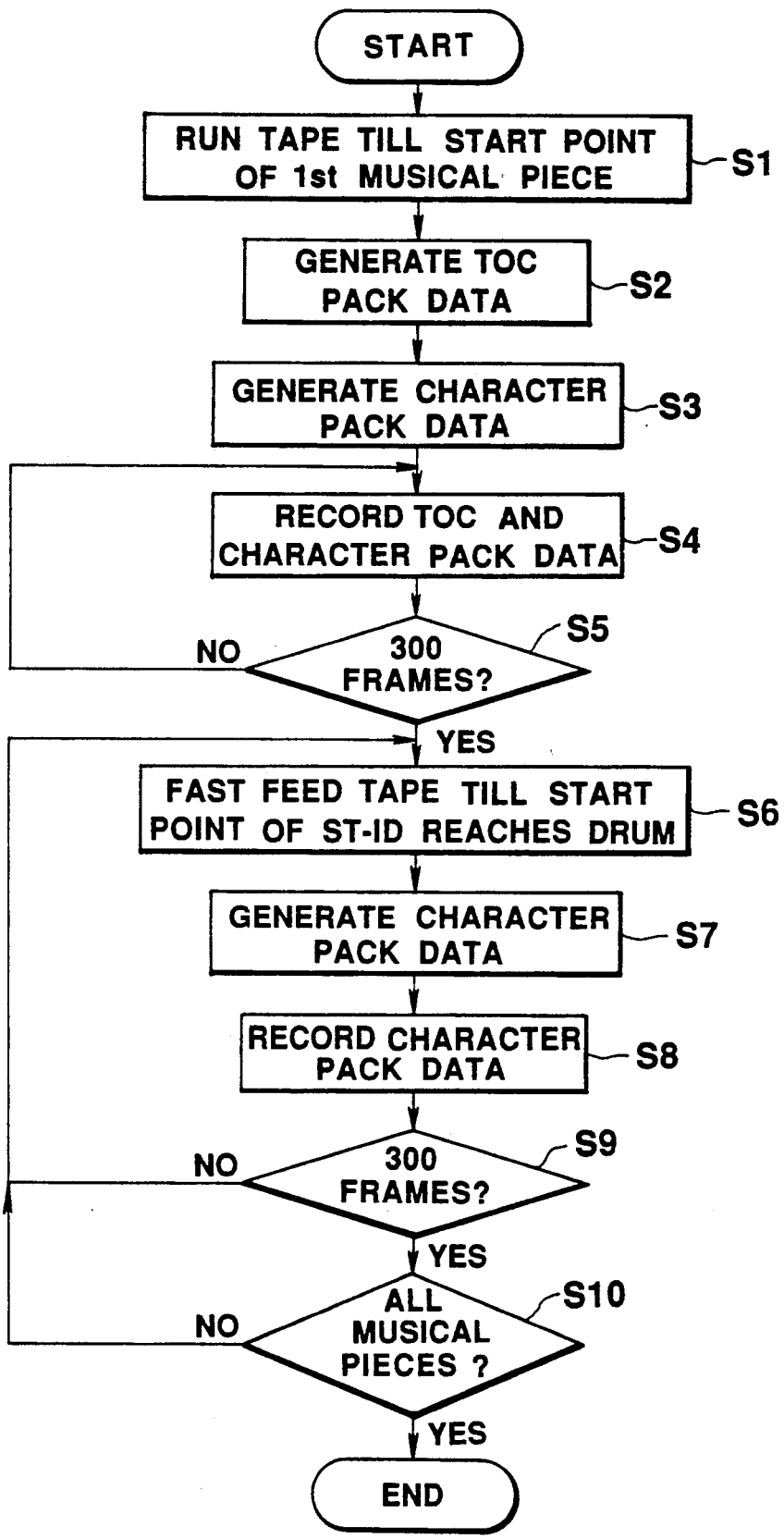
FIG. 15 is a control flow of a controller, which is for an after-record mode.

After rewinding the magnetic tape 12 up to the leading end of the tape, the controller 30 feeds the tape until the start point of the first musical piece is reached to the heads 13a, 13b (step S1, FIG. 15). This operation is done by detecting the ST-ID that is recorded over an area of 300 frames in the head portion of the musical piece. Specifically, the controller 30 plays back the tape from the start end at a rated speed. During the course of the playback operation, the controller 30 reads out the control ID of the sub-code ID from the control memory 31 and checks the ST-ID. If the ST-ID is detected, that operation is terminated. After finding the start point of the first musical piece, the controller 30 executes a control operation to generate the pack data of the TOC mode by using the entered characters and key code data, for example, that are stored in the control memory 31 (step S2). At the completion of recording the five musical pieces in the magnetic tape, the start time data of each musical piece, the number of programs recorded in the tape, and the like have been stored in a predetermined area of the memory 31. Those data are used as the pack data (PC5 to PC7) of the TOC mode as described with reference to FIG. 12. The controller 30 generates the pack data of the TOC mode as shown in FIGS. 13(a) and 13(b) by using the entered characters, the key code data, which are stored in the memory 31, and sends it to the processor 19.

The controller 30 generates "0100" as the item designating the TOC mode; "0" as the 4th bit as counted from the LSB; "0000" as PNO-1; "0000" as PNO-2; "0001" as PNO-3 (PNO-1 to PNO-3 indicate the musical No. 1); "1100 1010" (=CA) as point; "0000" (represents general code) as SORT and "0000" representing the ASCII code as FMT. The controller 30 outputs these data as PC1 to PC4 byte by byte. Then, the controller 30 reads out, from the control memory 30, the key code of first three characters ALL of the "ALLEGRO", that are the entered characters of the first musical piece, and converts and outputs the key code into the ASCII code in which each character consists of 8 bits. Then, the controller 30 outputs the parity data of one byte as PC8 for error check of the data of 7 bytes PC1 to PC7 that have outputted. The sub-code processor 19 stores into the subcode data memory 28 the data PC1 to PC8 as one package of pack data. The pack data PC1 to PC8 have been sent to the processor 19 byte by byte. For the succeedingly entered key code data "EGR", the controller 30 generates PC1 and PC2 which are same as that for the first three characters, "ALL"; "1100 1011" (=CB) as "POINT" in PC3; "0000" as "SORT" in PC4; and "0001" (=1) as as "ADR" in PC4. The controller 30 converts the key code data "EGR" into a corresponding ASCII code of 8 bits and outputs it an PC5 to PC7. Further, it produces the parity data for the data of 7 bytes that have already been outputted. The sub-code processor 19 stores into the sub-code data memory 28 the data PC1 to PC8 as one package of pack data. For the next character "O" and the key code entered by the "CR" key as a punctuation for the characters of the first musical piece, the controller 30 produces pack data PC1 to PC3 that are the same as those for the characters "EGR" as already outputted, "0000" as the SORT of PC4, and "0010" (=2) as the ADR. Further, the controller converts the next character "O" and the key code of the "CR" key into a corresponding ASCII code of 8 bits. More specifically, the key code data of the "CR" key is converted into a carriage return data (CR) and a line feed data (LF) in the ASCII code. For the data of less than 3 characters, the controller 30 produces "NULL" (NL) in the ASCII code. The pack data PC1 to PC8 are stored as one package of pack data into the memory 28. In this way, the pack data of the TOC mode for the "ALLEGRO" of the first musical piece have been generated. As already described, the first 3 characters are included in the pack data of the TOC mode in which POINT=CA, as shown in FIG. 13A. For the remaining characters, sets of 3 characters are included in the pack data of the TOC mode in which POINT=CB, and whose "ADR" is starting with "0001".

The controller 30 generates the pack data of the TOC mode for the remaining musical pieces in a similar way. The data that is already stored in the memory 31 and is to be recorded in the TOC mode, is also formatted in the pack data of the TOC mode (FIG. 11) for each POINT (FIG. 12). Then, the controller 30 generates character pack data by using the entered characters and the key code stored in the memory 31 (step S3). The controller 30 reads out the key code of the entered characters "ALLEGRO" of the first musical piece, from the memory 31. By using the readout data, the controller 30 generates the pack data of the text character mode (FIG. 9) and transfers it to the sub-code processing circuit 19.

The controller 30 generates "1000" as the item representing the text character mode; "0000" as SORT representing of the general code; "0000" as FMT indicating the ASCII code; and "0000" as ADR, byte by byte as the PC1 to PC2. Then, the controller 30 reads out of the memory 31 the key codes of the first five characters "ALLEG" of the "ALLEGRO" of the first musical piece. The controller 30 converts the readout key code data as PC8 into the ASCII code of 8 bits, and outputs them as the data PC3 to PC7. Further, it produces the parity data for the data PC1 to PC7 already outputted. The processor 19 receives the data PC1 to PC8 byte by byte, and stores them into the memory 28 as the one pack data. The controller 30 reads out the next character "RO" and the key code entered by the "CR" key as a punctuation for the characters of the first musical piece, and generates the data PC1 and PC8 by using the readout data, in a similar way. In this case, the address data ADR is "0001", which is advanced by one from the address data for the first 3 character. The key code data of the "CR" key is converted into a carriage return data (CR) and a line feed data (LF) in the ASCII code. For the data of less than 5 characters, the controller 30 produces "NULL" (NL) in the ASCII code. In this way, the pack data of the text character mode for the "ALLEGRO" of the first musical piece have been generated.

Then, the controller 30 reads out the key code of the first five characters "ALLEG" of the first musical piece, from the memory 31. By using the readout data, the controller 30 generates pack data of the search character mode (FIG. 10) and transfers it to the sub-code processing circuit 19.

More specifically, the controller 30 generates "1010" as item representing the search character mode; "0000" as SORT representing the general code; "0000" as FMT indicating the ASCII code; and "0000" as ADR representing "0" byte by byte. Then, the controller 30 reads out of the memory 31 the key codes of the first five characters "ALLEG" of the "ALLEGRO" of the first musical piece. The controller 30 converts the readout key code data into the ASCII code of 8 bits, and outputs them as the data PC3 to PC7. Further, it produces the parity data as PC8 for the data PC1 to PC7 already outputted. The processor 19 receives the data PC1 to PC8 byte by byte, and stores them into the memory 28 in the form of one pack data. At this point, generation of the pack data of the search character mode is completed.

Following the completion of generating the pack data of the TOC mode and the pack data of the text character mode and the search character mode, the controller 30 executes a control for recording the pack data of the TOC mode and the character code data of the first musical piece, into the magnetic tape 12 (step S4).

Figure 18:
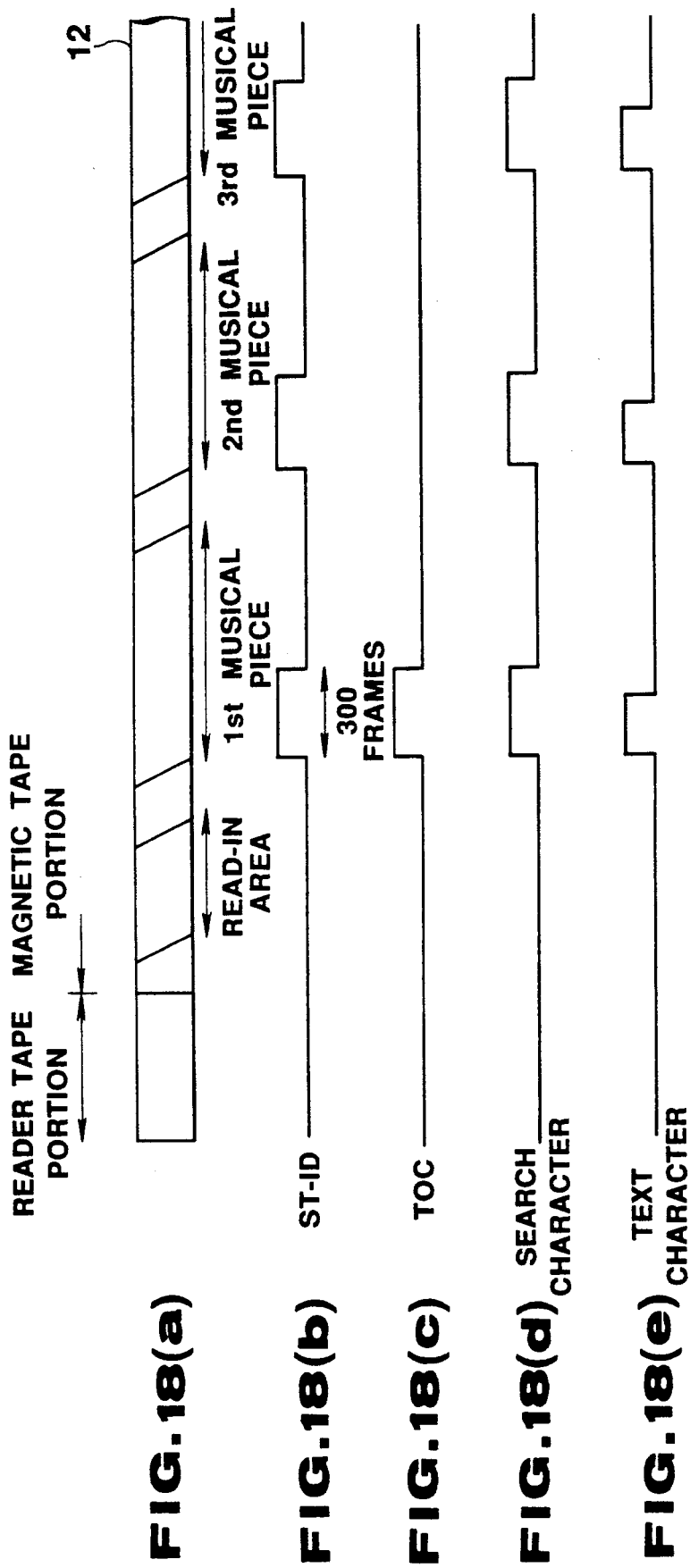
FIGS. 18(a) to 18(e) are views showing recording positions of the data on a magnetic tape.

The magnetic tape 12 is provided in the leading end with a reader tape portion for optically detecting the tape end, as shown in FIG. 18(a). The reader tape portion is followed by a magnetic tape portion. A read-in area of a predetermined length is located in the leading end of the magnetic tape portion. In this area, a PCM audio data is recorded in a soundless manner and in the format shown in FIG. 3. Storage of the programs (musical pieces) starts at the position on the tape where the tape runs for about one second from the read-in area. The ST-ID data is stored in the first 300 frames of each musical piece (FIG. 18(b)).

The pack data of the TOC mode is recorded on the tape from the head of the first musical pieces (FIG. 18(c)). The pack data of the second character mode is recorded on the tape in the first 300 frames of each musical piece (FIG. 18(e)). The pack data of the text character mode is recorded on the tape from the head of each musical piece (FIG. 18(e)).

The controller 30 controls the mechanism 35 so that the magnetic tape 12 in which the head of the first musical piece has been reached the dram 11, runs at the rated speed, and the drum 11 is driven. Further, the controller 30 places only the sub-code record area in a record mode, and the other areas in, a playback mode. Then, the controller 30 reads out of the memory 28, pack data of the TOC mode, the pack data of the search character mode, and pack data of the text character mode. The sub-code processor 19 transfers those items of pack data transferred from the controller to the frame composition circuit 18 at the timing that the sub-code recording area reaches above the drum 11. The data output from the circuit 18 is applied to the heads 13a and 13b through the modulator 20 and the amplifier 21. Then, the pack data is recorded in the area of one frame of the sub-code recording area of the tape 12. This process sequence is repeated until the pack data of the TOC mode are recorded in the area of 33 frames, for example, as shown in FIG. 17. The pack data of the text character mode are recorded with the unit of two frames of the same data are stored in the order of addresses, as shown in FIG. 16. The pack data of the search character mode are recorded in a continuous manner, as shown also in FIG. 16. The controller 30 generates the pack data (the program time, the absolute time, the runing time) designated by the items "0001", "0010", and "0011" (FIG. 8), based on the data stored in the memory 31 (the data to be recorded as the TOC mode data as is stored at the time of recording musical pieces). Further, the controller 30 operates such that with setting the ST-ID data at "1", the same sub-code data as that before the rewrite of the sub-code data is recorded, together with the pack data of the TOC mode, the pack data of the text character mode and search character mode.

Through the sequence of the processings, the sub-code data has been rewritten in the area of the first 300 frames of the sub-code recording area where the first musical piece is stored. Then, the controller 30 enters the processing in step 6. In this step, the tape 12 is fast fed to find the start point of the next musical piece (second musical piece). When the start point of the second musical piece is detected, the controller 30 reads out the entered characters and the key code of the second musical piece from the memory 31. Then, by using the readout data, the controller executes control flows similar to those for the first musical piece, to generate the pack data of the text character mode and the pack data of the search character mode, and transfers them to the sub-code processor 19 (step 7). The controller 30 exercises the control of recording the characters of the second musical pieces, so that the sub-code data is re-written in the area of the first 300 frames in the sub-code recording area where the second musical piece is stored (steps S8 and S9). Subsequently, the processing for recording the characters into the leading portion of the remaining musical pieces is repeated (S6 to S9). When this processing is executed for all of the characters as entered (step 10), the after-record processing is completed.

CHARACTER DISPLAY OPERATION

Through the after-record processing, the pack data including the character data of the TOC mode are stored in the leading portion of the first musical piece on the tape 12, as shown in FIG. 17, and the character code data is recorded in the leading portion of each musical piece on the tape 12, as shown in FIG. 16. To play back the data recorded in the tape 12, the [PLAYBACK] key is operated. In response to this, the record/playback system drives the loud speaker to sound the PCM data, while at the same time the controller 30 executes a control flow shown in FIG. 19.

Figure 19:
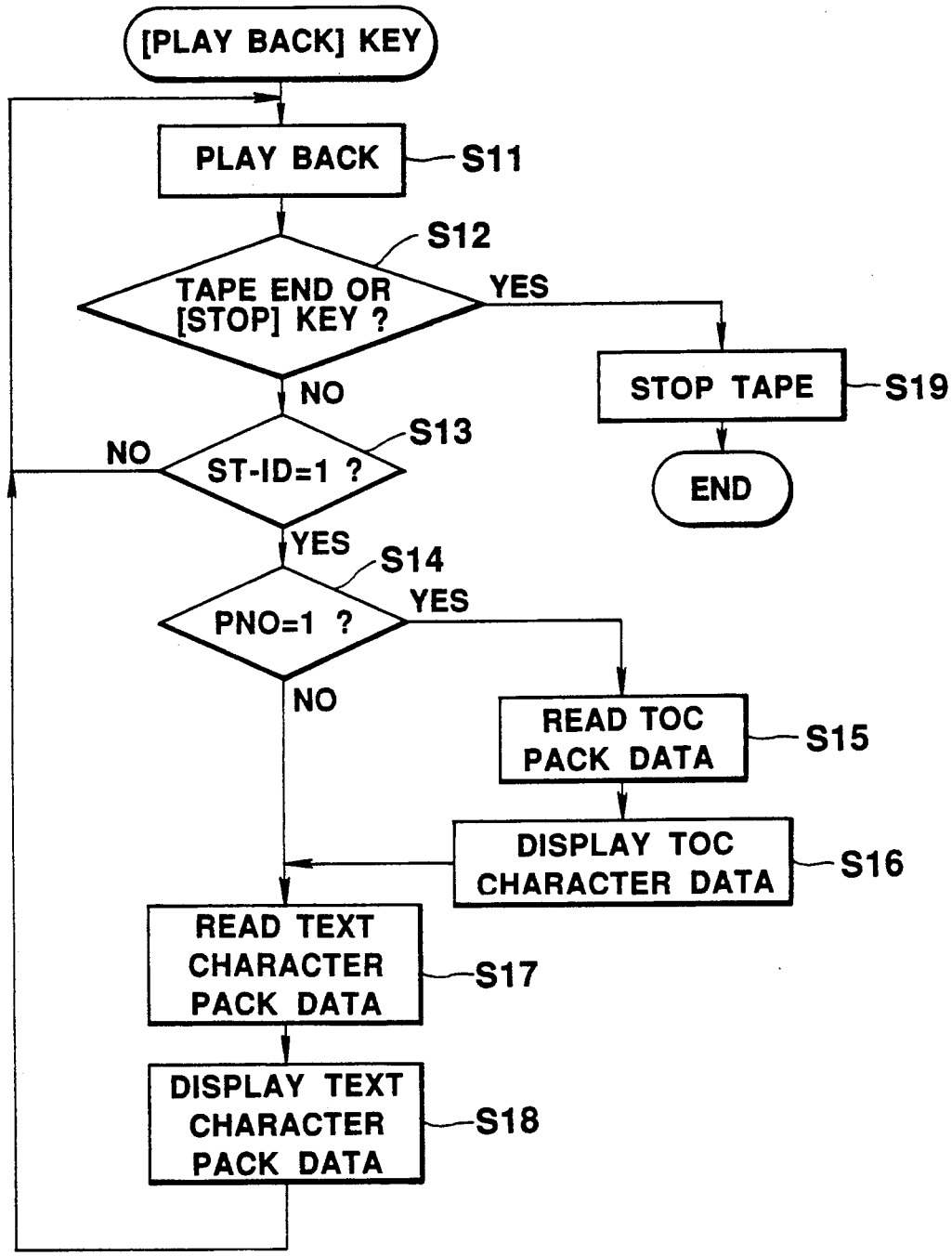
FIG. 19 is a control flow of a controller, which is for a constant-speed play-back mode.

The control flow of FIG. 19 will be described. The after-record mode switch is turned off, and the [PLAYBACK] key is operated. The controller 30 controls the mechanism 35 and the related circuits to put the record/playback system (FIG. 1) in a tape playback mode (step S11, FIG. 19). The playback mode continues till the trailing end of the tape is detected in step S12 or the operation of the [STOP] key is detected. The detection of the tape trailing end is done by optically detecting a transparent reader tape portion, which is located at the leading and trailing ends of the tape, by means of a detector (not shown). The controller 30 checks the output signal of the detector. In the playback mode, the frame decomposition circuit 24 transfers the sub-code data stored in the sub-code recording area, to the sub-code processor 19. The processor 19 stores the data of the sub-code ID in the memory 29, and stores into the memory 28 the sub-code data that are subjected to the parity check and are determined to be correct. The storage of the sub-code data is done for each item (FIG. 8), for example, the program time data for the item "0001", the tape absolute time data for the item "0010", and the text character data for the item "1000". In the playback mode, the controller 30 issues a command to request the outputting of the ST-ID, to the processor 19 (step S13). When the start point of the tape area storing the program reaches just above the drum 11, the ST-ID data recorded in the area of 300 frames in the start portion of that tape area, are reproduced. The processor 19 sends an ST-ID detect signal to the control 30. In response to the ST-ID detect signal, the controller 30 issues a PNO detect command to the processor 19 (step 14). When the processor 19 detects PNO=1, it sends a detect signal to the controller 30. In response to the detect signal, the controller 30 determines that the present tape position is at the start point of the first musical piece, and issues a command to read the pack data of the TOC mode to the processor 19. This command is used for causing the processor 19 to successively read out of the memory 28 the pack data with the item of "0100" and the POINT of CA or CB, and to return them to the controller 30. Receiving the command, the processor 19 successively read out of the memory 28 the pack data of the TOC mode including the character code data and outputs these data to the controller 30. When receiving the pack data thus read out, the controller 30 converts the character code data of PC5 to PC7 of received pack data, into the display data. The display data is stored into the display register in the memory 31. In this case, the controller 30 stores the character code data into the display register for each musical piece on the basis of the PNO-1 to PNO-3. The character code data designated by the POINT of CA is first stored in the display register. Subsequently, the character code data designated by the POINT of CB are stored therein in the order of the addresses. Under control of the controller 30, the display data stored in the display register, that have been read out in step S15, are sequentially transferred to the display 33 through the driver 32. As a result, the characters contained in the pack data of the TOC mode are displayed by the display 33 (step S16).

In this case, in the TOC display area in the display 33, the characters are displayed in the program order, as shown in FIG. 14. Since the character code data of the pack data of the TOC mode contains the titles of all of the musical pieces, this display presents those titles to the operator. The controller 30 issues to the processor 19 a command to successively read out of the memory 28 the pack data of the text character mode with the item of "1000", in the order of address ADR from "0000" (step S17). In response to the command, the processor 19 successively read out of the memory 28 the pack data of the text character mode. The controller 30 converts the character code data of PC3 to PC7 of the pack data of the text character mode into display data, and stores it in the display register of the memory 31. The text character pack data is stored with the unit of two frame, as shown in FIG. 16. Therefore, it has a redundancy enough to ensure a correct playback in a constant speed playback mode.

In step S18, under control of the controller 30, the display data stored in the display register, that have been read out in step S15, are sequentially transferred to the display 33 through the driver 32. As a result, the characters contained in the pack data of the TOC mode are displayed by the display 33. The display of these characters is continued until pack data of the text character mode of the next musical piece in the start portion of the program as shown in FIG. 16, are read out in step S17 and then are displayed. During the playing back of a musical piece, the titles of the musical pieces, and the like are constantly displayed. As for the second musical piece and sub-sequent ones, the text character are displayed (step S14), but the TOC character are not displayed. When the tape 12 is being played back, if the step S12 detects the trailing edge of the tape, the controller 30 controls the mechanism 35, to stop the tape running (step S19).

Figure 20:
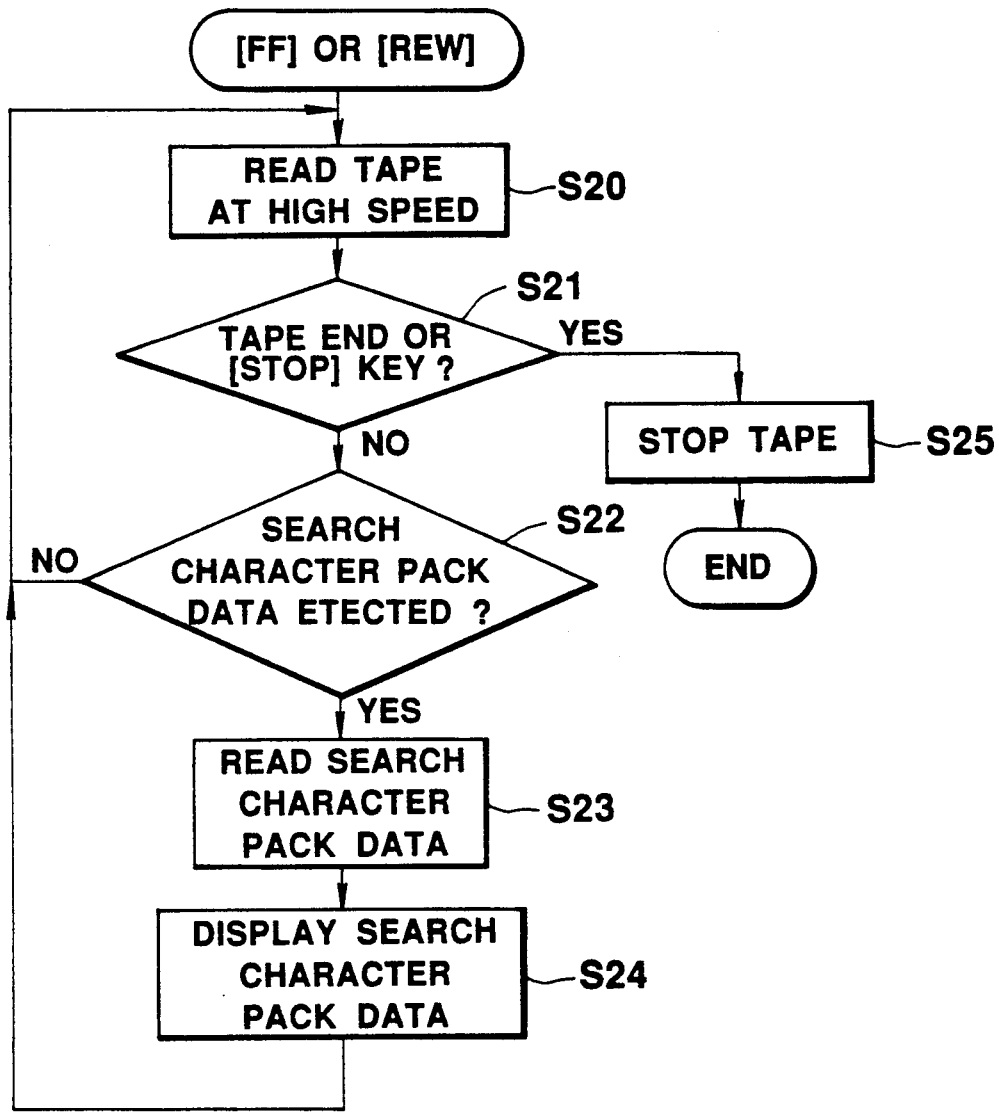
FIG. 20 is a control flow of a controller, which is for a high-speed play-back mode.

When the tape runs at a high speed, the character display is possible. When the after-record mode swich is in an off state, the [FF] key or the [REW] mode switch is operated and the controller 30 executes a control flow shown in FIG. 20. In step S20, the controller 30 controls the mechanism 35 and the related circuits to place the system in a high speed playback mode. In this mode, the tape runs at the speed 100 times the normal speed. When the [FF] key is operated, the tape runs forwardly. When the [REW] key is operated, it runs backwardly. In the high speed playback mode, the circuit 24 transfers the sub-code data that is stored in the sub-code recording area, to the processor 19. The processor 19 stores the sub-code ID data into the memory 29. Further, the processor 19 stores the sub-code data, whose parity data is correct, in the memory 28. The storage of the sub-code data is done for each pack item (FIG. 8); the program time data for the item "0001", the tape absolute time data for the item "0010", and the search character data time for the item "1000". The high speed playback mode continues until the tape end or the operation of the [STOP] key is detected (step S21). The controller 30 issues a command to read out of the memory 28 the pack data of the search character mode with the item "1010", and applies it to the processor 19 (step S22). In response to the command, the processor 19 executes the command. The controller 30 converts the data of PC3 to PC7 of the pack data of the search character mode into the display data, and stores it into the display register of the memory 31 (step S23). The pack data of the search character mode is recorded in 300 frames, as shown in FIG. 16. Therefore, it has a redundancy enough to ensure a correct playback in the high speed playback mode To be mode specific, a plurality of the tracks obliquely arrayed (FIG. 2) are scanned by the couple of the heads 13a and 13b. The recording of the 300 frames of the pack data of the search character mode into the display data is redundant enough to ensure the read out of the data from any of the tracks even in the high speed playback mode.

Under control of the controller 30, the display data that have been read out in step S23 and stored in the display register, are sequentially transferred to the display 33 through the driver 32. As a result, the pack data of the search character mode are displayed by the display 33 (step S16). The display of the characters is continued until the pack data of the search character mode of the next musical piece that has been stored in the start portion of the next program in steps S27 and S28, are read out and then are displayed. Repeating the sequence of the processings, the character data are progressively displayed in the high speed playback mode. The display of the search characters in the high speed playback enables an operator to quickly know what musical pieces are stored in the tape.

SEARCH OPERATION USING CHARACTER DATA

With use of the search characters, an operator can search the program recorded in the tape by the title of the musical pieces. To search, the after-record mode switch is turned off. The first five characters of the tile of his intended musical piece are entered by the character keys. Then, the [CHARACTER] key and the [playback] key are operated. The code data of the five characters are stored into the memory 31. The controller 30 controls the mechanism 35 to feed the tape 12 at the 100 times speed through the mechanism drive, and cause the paired heads 13a and 13b to read out the data from the tape 12. The processor receives the data in the sub-code recording area. When the processor 19 receive the pack data of the search character mode with the item of "1010", the processor sends the character code data of PC3 to PC7 of the pack data to the controller 30. The controller 30 compares the character code data (PC3 to PC7) from the processor 19 with the ASCII code of the five characters that is stored in the memory 31. When those contents of the data are coincident, the controller 30 stops the feed of the tape 12. Then, the controller 30 searches the start point of the ST-ID data, and then plays back the musical piece. In this way, the intended musical piece can be searched by using the title of the musical piece.

In the description thus far made, the recording of the pack data of the TOC mode into the start portion of the tape is based on the character data entered by the character keys. If necessary, it is also possible to record the TOC data including the character data, by entering characters, into the tape in which the TOC data is not recorded and only the character data of each musical piece are recorded in the start portion of the musical piece. In this case, an operator must previously play back the entire record on the tape in a normal playback mode. The controller 30 reads out the character data of the all of the musical pieces from the start portion of the program on the tape, and stores the data together with the program start time data in the memory 31. Under this condition, an operator turns on the after-record mode switch, and the [TOC] key. Then, the controller 30 operates in accordance with a control flow of FIG. 21.

Figure 21:
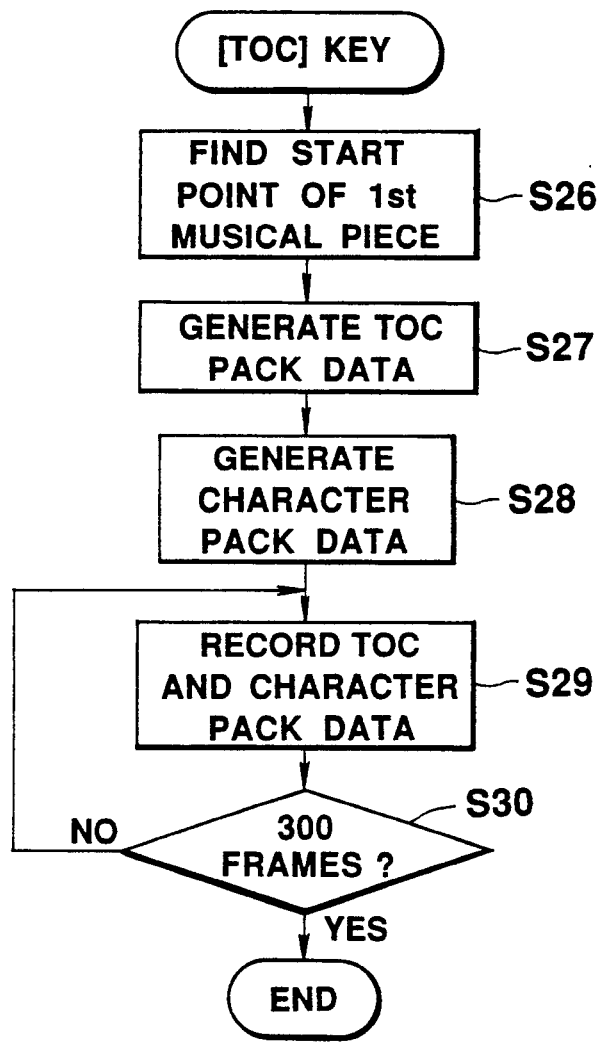
FIG. 21 is a control flow of a controller when only the pack data of the TOC mode are recorded.

As shown, the controller 30 rewinds the tape 12 up to the leading end of the tape, and then searches the start point of a first musical piece (step S26, FIG. 21). The start point detection is made by detecting the ST-ID data that is stored in the 300 frames in the start portion of the musical piece. More specifically, the controller 30 plays back the tape from its leading end. During the playback operation, the controller 30 reads out the ST-ID data from the memory 31, and checks it. When it detects the start point of the musical piece, the controller 30 generates the pack data of the TOC mode on the basis of the data including the pack data of the text character mode (step S27). In accordance with the text character data stored in the memory 31, the controller 30 generates the pack data of the TOC mode of all of the musical pieces, and transfers it to the processor 19. Also in accordance with the data that is already stored in the memory 31 and is to be recorded as the pack data of the TOC mode, the controller 30 can generates the pack data of the TOC mode as shown in FIG. 11, for each POINT (FIG. 12).

Then, the controller 30 generates the pack data of the text character mode and search character mode in accordance with the text character data of the pack data of the text character mode of the first musical piece that is stored in the memory 31 (step S28). In this step, the pack data of the text character mode and the search character mode that are shown in FIGS. 9 and 10, are generated from the text character data of the first musical piece as already stored. At the completion of the generation of the pack data of the TOC mode, the pack data of the text character mode, and search character mode, the controller 30 executes a control to store the TOC characters and the characters of the first musical piece into the tape 12 (step S29). When the recording of the data in the 300 frames is completed (step S30), the character recording operation for the TOC is completed.

The keyboard 36 may be replace by a microcomputer or a suitable external device for character data entering.

What is claimed is:

1. An apparatus for recording character data together with digital data for a plurality of programs on a magnetic tape having a plurality of tracks, and for reproducing recorded data, said apparatus comprising:

magnetic head means provided with a plurality of magnetic heads for reproducing recorded data and for recording data on tracks on said magnetic tape, each of the tracks having a PCM data recording area and sub-code recording areas;

signal processing means for receiving the digital data, and including means for adding an error correction code to the digital data to generate PCM data;

sub-code processing means for generating sub-code block data having pack data, the pack data including a pack item, a data block, and a parity block;

frame composing means coupled to said signal processing means and to said sub-code processing means, for composing PCM data at a timing corresponding to said PCM data recording area and sub-code block data at a timing corresponding to a sub-code recording area to output the composed data;

modulating means, coupled to said magnetic head means and to said frame composing means, for modulating the composed data relating to each of the programs;

character data input means for inputting character data relating to each of the programs; and control means, coupled to said sub-code processing means, and to said character data input means, for supplying character code data corresponding to the character data input by said input means to said sub-code processing means, for controlling said sub-code processing means so that said sub-code processing means generates, for each of the programs, the sub-code block data including pack data of a character code including the character code data relating to a respective program, the sub-code block data further including pack data of a Table of Contents mode including the character code data of the Table of Contents mode which includes the character code data relating to all of the programs, and for controlling said modulating means and said magnetic head means so that said modulating means and said magnetic head means record said sub-code block data which contains the pack data of the character code including the character code data relating to a respective program being stored in a sub-code recording area of such corresponding program of the magnetic tape automatically, and said sub-code block data which contains the pack data of the Table of Contents mode including the character code data relating to all of the programs being stored in a predetermined sub-code recording area of a first program of the programs.

2. The apparatus of claim 1, wherein said sub-code processing means includes means for generating the pack data of the Table of Contents mode including program number data and character code data relating to said program number data.

3. The apparatus of claim 1, further comprising:

playback signal processing means for receiving a signal reproduced by said magnetic head means, for detecting the sub-code block data from the signal reproduced by said magnetic head means, and for detecting the pack data of the Table of Contents mode included in the sub-code block data; and display means for displaying character data; and wherein said control means includes means for controlling the playback signal processing means to supply the character code data relating to all of the programs included in the pack data of the Table of Contents mode to said display means to cause said display means to display character data corresponding to the character code data.

4. The apparatus of claim 1, wherein:

said sub-code processing means includes means for generating the pack data of the Table of Contents mode comprising a data block including program number data, character code data relating to said program number data, and pack address data; and said control means includes means for supplying the program number data and the character code data to said display means in the order of the pack address, whereby said display means displays the character code data relating to the programs.

5. The apparatus of claim 1, wherein said PCM data comprises PCM audio data, and is recorded as audio data in said PCM data recording area.

6. An apparatus for recording character data together with digital data for a plurality of programs on a magnetic tape having a plurality of tracks, and for reproducing recorded data, said apparatus comprising:

magnetic head means provided with a plurality of magnetic heads for reproducing recorded data and for recording data on tracks on said magnetic tape, each of the tracks having a PCM data recording area and sub-code recording areas;

signal processing means for receiving the digital data, and including means for adding an error correction code to the digital data to generate PCM data;

sub-code processing means for generating sub-code block data having pack data, the pack data including a pack item, a data block, and a parity block;

frame composing means coupled to said signal processing means and to said sub-code processing means, for composing PCM data at a timing corresponding to said PCM data recording area and sub-code block data at a timing corresponding to a sub-code recording area to output the composed data;

modulating means, coupled to said magnetic head means and to said frame composing means, for modulating the composed data relating to each of the programs;

character data input means for inputting character code data relating to each of the programs;

control means, coupled to said sub-code processing means, and to said input means, for supplying character code data corresponding to the character data input by said input means to said sub-code processing means, for controlling said sub-code processing means so that said sub-code processing means generates, for each of the programs, the sub-code block data including pack data of a character mode including the character code data relating to a respective program, the sub-code block data further including pack data of a Table of Contents mode including the character code data of the Table of Contents mode which includes the character code data relating to all of the programs, and for controlling said modulating means and said magnetic head means so that said modulating means and said magnetic head means record said sub-code block data which contains the pack data of the character mode including the character code data relating to a respective program being stored in a sub-code recording area of such corresponding program of the magnetic tape, and said sub-code block data which contains the pack data of the Table of Contents mode including the character code data relating to all of the programs being stored in a predetermined sub-code recording area of the magnetic tape wherein said sub-code processing means includes means for generating said sub-code block data including sub-code ID, said sub-code ID including control ID, and said control ID including four independent IDs, one of said independent IDs being a start ID; and said control means includes means for controlling said sub-code processing means to cause said sub-code processing means to generate the sub-code block data including a start ID which is set to "1", and the pack data of the Table of Contents mode having character code data.

7. Apparatus for recording character data together with digital data for a plurality of programs on a magnetic tape having a plurality of tracks, and for reproducing the recorded data, said apparatus comprising:

magnetic head means provided with a plurality of magnetic heads for recording data on tracks on said magnetic tape, each of the tracks having a PCM data recording area and sub-code recording areas, each of said sub-code recording area storing a sub-code block data which contains pack data of a character mode including the character code data corresponding to a respective program;

signal processing means, for receiving the digital data, and including means for adding an error correction code to the digital data to generate PCM data;

sub-code processing means for generating the sub-code block data having pack data, the pack data including a pack item, a data block, and a parity block;

frame composing means coupled to said signal processing means and to said sub-code processing means, for composing the PCM data at a timing corresponding to said PCM data recording area and the sub-code block data at a timing corresponding to said sub-code recording area to output the composed data as track format data;

modulating means, coupled to said magnetic head means and to said frame composing means, for modulating the track format data and outputting a recording signal to said magnetic head means;

storing means for storing data;

playback signal processing means, coupled to said magnetic head means, for detecting the sub-code block data from a signal reproduced by said magnetic head means, and for detecting pack data of the character mode including character code data relating to each of the programs included in the sub-code block data; and control means, coupled to said sub-code processing means, to said storing means, and to said playback signal processing means, (1) for controlling said playback signal processing means and said storing means so that said storing means stores the character code data related to each program included in the pack data of the character mode when said playback means detects the pack data of the character mode during a regeneration, (2) for controlling said sub-code processing means so that said sub-code processing means generates the sub-code block data including the pack data of a Table of Contents mode, said pack data of the Table of Contents mode including character code data relating to all of the programs after the character code data relating to all of the programs are stored in the storing means and (3) for controlling said modulating means to record the generated sub-code block data including the pack data of the Table of Contents mode into a predetermined sub-code recording area of the magnetic tape.

8. The apparatus of claim 7, wherein said control means, after the character code data corresponding to all of the programs are stored in said storing means, controls said sub-code processing means so that said sub-code processing means generates pack data of the character mode including character code data relating to a first program of said programs; and said control means includes means for controlling said modulating means and said magnetic head means so that said recording and modulating means and said magnetic head means record the generated sub-code block data including the pack data of the Table of Contents mode and the generated sub-code block data including the pack data of the character mode with character code data relating to the first program into the sub-code recording area of the first program.

9. The apparatus of claim 7, wherein said modulating means and said magnetic head means include means for recording said pack data of the Table of Contents mode in the sub-code recording area corresponding to the first program.

10. The apparatus of claim 7, wherein said sub-code processing means includes means for generating the pack data of the Table of Contents mode including program number data and character code data relating to said program number data.

11. The apparatus of claim 7, wherein:

said sub-code processing means includes means for generating sub-code block data including sub-code ID, said sub-code ID including control ID, and said control ID including four independent IDs, one of said independent IDs being a start ID; and said control means includes means for controlling said sub-code processing means to cause said sub-code processing means to generate the sub-code block data including a start ID which is set to "1", and the pack data of the Table of Contents mode having character code data.

12. The apparatus of claim 7, further comprising:

display means for displaying character data;

and wherein said playback signal processing means includes means for detecting the sub-code block data from the signal supplied from said magnetic head means, and for detecting the pack data of the Table of Contents mode included in the sub-code block data; and said control means includes means for controlling the display means and said playback signal processing means so that said display means displays character data corresponding to the character code data.

13. The apparatus of claim 7, wherein:

the pack data of said Table of Contents mode comprises a data block including program number data, character code data relating to said program number data, and pack address data; and said control means includes means for supplying the program number data and the character code data to said display means in the order of the pack address, whereby said display means displays the character code data relating to the programs.

14. The apparatus of claim 7, wherein said PCM data comprises PCM audio data, and is recorded as audio data i said PCM data recording area.

* * * * *